(12) United States Patent
Eull

(10) Patent No.: US 6,604,765 B1
(45) Date of Patent: Aug. 12, 2003

(54) REAR UNDER-RIDE PROTECTION DEVICE

(75) Inventor: Thomas E. Eull, Blaine, MN (US)

(73) Assignee: Schwing America, Inc., White Bear Lake, MN (US)

( * ) Notice: Subject to any disclaimer, the term of this patent is extended or adjusted under 35 U.S.C. 154(b) by 0 days.

(21) Appl. No.: 10/099,318

(22) Filed: Mar. 15, 2002

(51) Int. Cl.$^7$ ............................................. B60R 19/38
(52) U.S. Cl. ........................ 293/118; 293/132; 293/104
(58) Field of Search ................................ 293/118, 119, 293/133, 112, 117, 126, 146; 224/924, 532, 42.21, 521, 495; 414/462; 296/204

(56) References Cited

U.S. PATENT DOCUMENTS

| | | | | |
|---|---|---|---|---|
| 2,188,142 A | * | 1/1940 | Blair ............................ | 293/118 |
| 3,709,542 A | * | 1/1973 | Fehlau et al. ................ | 293/118 |
| 3,785,541 A | * | 1/1974 | Sibley ......................... | 224/408 |
| 3,837,422 A | * | 9/1974 | Schlanger .................... | 280/734 |
| 3,871,695 A | * | 3/1975 | Koenig ........................ | 293/118 |
| 3,913,963 A | * | 10/1975 | Persicke ..................... | 293/118 |
| 3,923,330 A | * | 12/1975 | Viall et al. .................. | 293/118 |
| 4,026,590 A | * | 5/1977 | Holm .......................... | 293/118 |
| 4,266,818 A | | 5/1981 | Hightower .................. | 293/150 |
| 4,360,228 A | | 11/1982 | Rasmussen et al. ........ | 293/118 |
| 4,410,207 A | * | 10/1983 | Scharf ........................ | 293/118 |
| 4,514,002 A | * | 4/1985 | McIntosh .................... | 293/118 |
| 4,541,661 A | * | 9/1985 | Hawk .......................... | 293/117 |
| 4,582,351 A | * | 4/1986 | Edwards ..................... | 293/118 |
| 4,641,871 A | * | 2/1987 | Vaughn ....................... | 293/118 |
| 4,770,420 A | * | 9/1988 | Gottwald et al. ........... | 293/104 |
| 4,988,258 A | * | 1/1991 | Lutz et al. ................... | 293/118 |
| 4,991,890 A | * | 2/1991 | Paulson ...................... | 293/118 |
| 5,507,546 A | * | 4/1996 | Holley ........................ | 293/133 |
| 5,520,428 A | * | 5/1996 | Bell ............................ | 293/118 |
| 5,624,143 A | * | 4/1997 | Waldschmitt ............... | 293/118 |
| 5,632,518 A | * | 5/1997 | Kendall ...................... | 293/118 |
| 5,673,953 A | * | 10/1997 | Spease ....................... | 293/118 |
| 6,059,330 A | | 5/2000 | Moffett et al. .............. | 293/118 |
| 6,089,629 A | * | 7/2000 | Hope et al. ................. | 293/118 |
| 6,116,667 A | * | 9/2000 | Torcomian ................. | 293/132 |
| 6,142,542 A | * | 11/2000 | Sherno ....................... | 293/132 |
| 6,176,529 B1 | * | 1/2001 | Kitzmiller et al. .......... | 293/102 |
| 6,394,512 B1 | * | 5/2002 | Schuster et al. ............ | 293/118 |

\* cited by examiner

*Primary Examiner*—Kiran Patel
(74) *Attorney, Agent, or Firm*—Kinney & Lange, P.A.

(57) ABSTRACT

An improved bumper system includes a pair of brackets connected to the spaced frame members of a motor vehicle. A support arm is pivotally connected at one end to each of the brackets. The opposite end of each support arm is connected to a transverse beam that forms separate first and second bumper sections. The brackets support the support arms and bumper sections at a desired height above the ground. Each support arm is maintained relative to the respective bracket by gravity. A shear pin provides a redundant retention of the arm relative to the bracket. The arms and bumper sections of the improved bumper system remain in position relative to the bracket even in the event of a horizontal impact. A vertical impact of one or both bumper sections by obstacles or terrain causes the shear pin to be severed, allowing the bumper section(s) to pivot relative to the bracket, rather than to bend or deform.

5 Claims, 6 Drawing Sheets

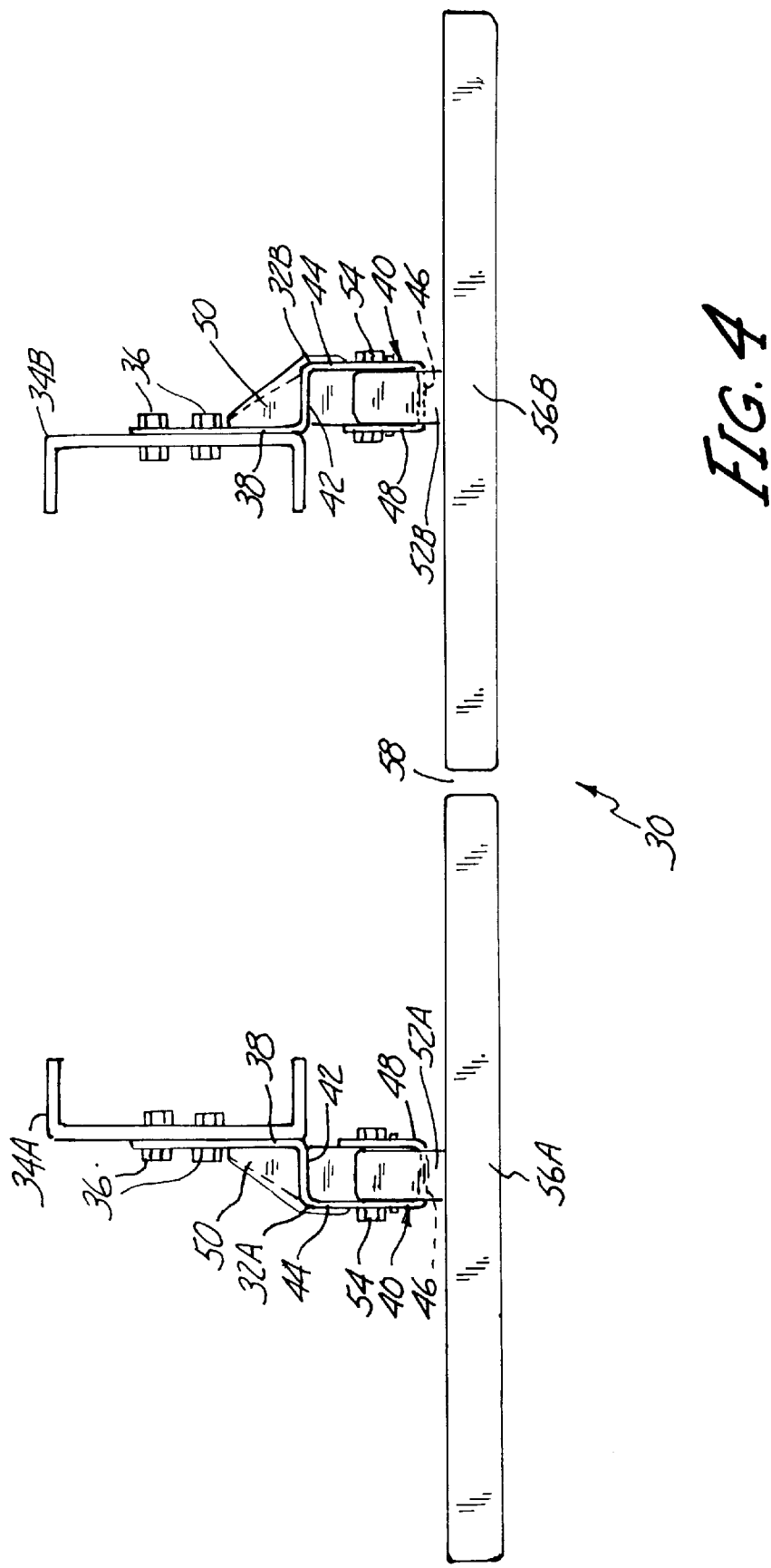

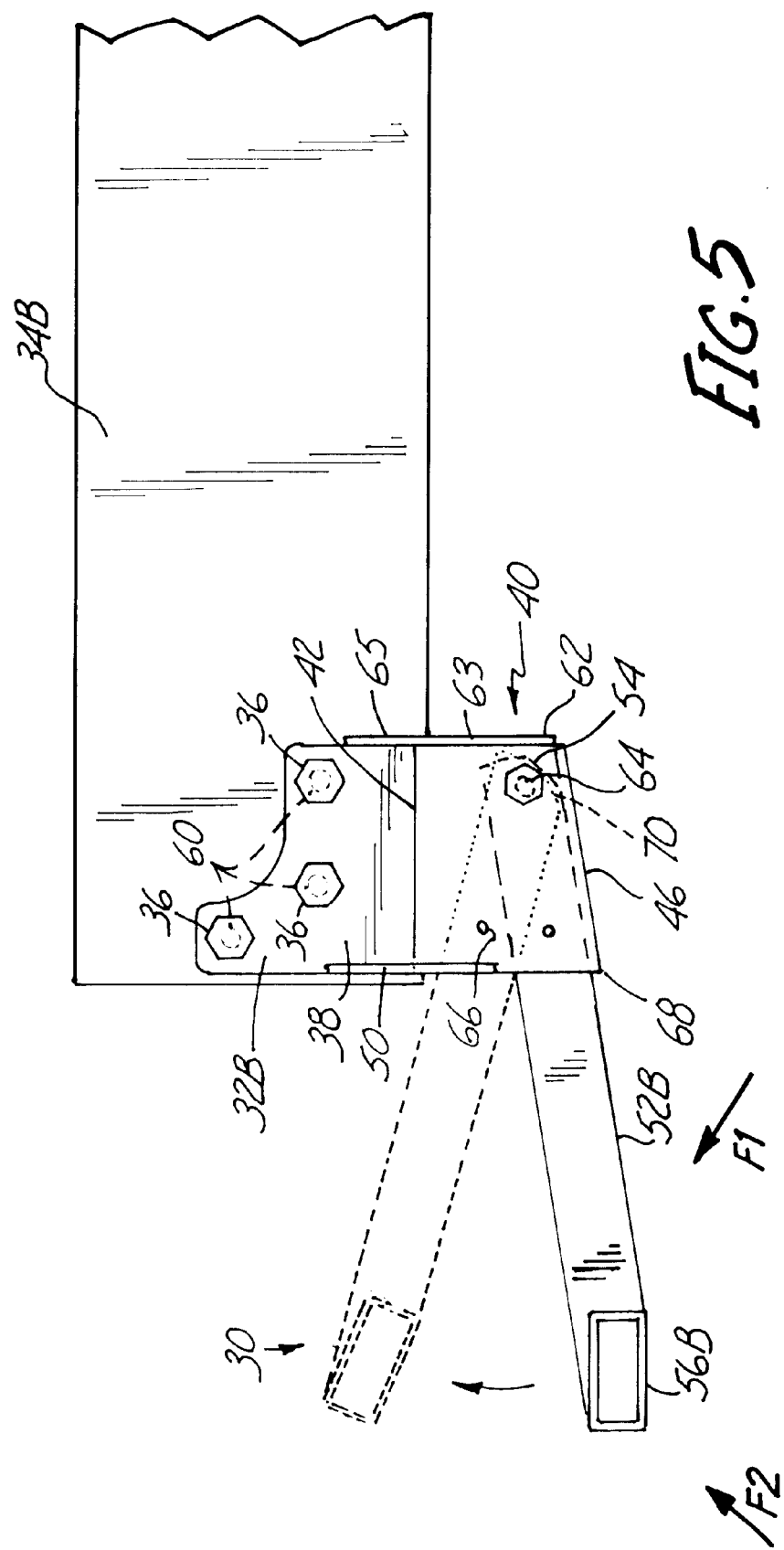

REAR UNDER-RIDE PROTECTION DEVICE

BACKGROUND OF THE INVENTION

The present invention relates to rear under-ride protection for motor vehicles. In particular, the present invention relates to a hinged bumper that avoids damage to the bumper in the event of a vertical force to the bumper.

The U.S. Department of Transportation ("U.S. D.O.T."), Federal Highway Administration has prescribed safety regulations for federal motor carriers which in relevant part address rear end protection for motor vehicles. Specifically, motor vehicles manufactured after Dec. 31, 1952 which have a ground clearance at the rear end of more than thirty inches from the ground are required to have a bumper substantially constructed and firmly attached to the vehicle at a height of no more than thirty inches above the ground. In addition, the bumper may not be located more than twenty four inches forward of the extreme rear of the vehicle. The objective of this regulation is to ensure that the bumpers of larger motor vehicles approximate the height of the bumpers of smaller motor vehicles and thereby prevent, in the event of a collision, the smaller vehicles from under-riding the rear end of larger vehicles.

One way large vehicle operators have complied with this safety regulation is by welding or bolting a metal bumper to the frame of the motor vehicle. In such a case, a pair of spaced supports which carry the bumper are attached to the frame. The length and angle of the supports are selected to properly position the bumper. The bumper itself is typically formed from a heavy gauge metal beam and is welded to the supports.

Damage to the bumper other than by rear end vehicle collisions can occasionally occur. For example, for motor vehicles that operate on or off road, such as concrete mixing trucks, may encounter changes in ground elevation as the trucks are backing up, or as they are moving forward, which can result in rear bumper contact. Such contact between prior art bumpers and the ground can result in a vertical force being applied to the bumper. Other conditions may also result in a vertical force being applied to the bumper. If the vertical force from the contact is sufficient, a partial or complete bending of the bumper can result, with a consequent change in its elevation from level ground or its forward position relative to the extreme rear of the vehicle. This in turn requires that the bumper be repaired, if possible, or replaced, before the vehicle is again in compliance with the federally prescribed safety regulations. Thus, while the above described prior art bumpers comply with the safety regulations, their maintenance requires considerable time and expense. There is a need for an improved rear under-ride protection device for a motor vehicle that meets federal safety regulations and minimizes the time and cost of maintaining such a device.

BRIEF SUMMARY OF THE INVENTION

The bumper system of the present invention connects to the spaced frame members of a motor vehicle frame. The bumper system comprises a pair of brackets, each bracket having a first portion that is connectable to one of the frame members, and a second portion which provides a support surface. Connected to each bracket is an arm. A first end of each arm is pivotally connected to the second portion of one of the brackets. When the bracket is mounted to a frame member, the arm is supported by the support surface when the arm is in a first position, but the arm is movable about the pivotal connection. A bumper section having first and second ends is connected to the second end of each arm

BRIEF DESCRIPTION OF THE DRAWINGS

FIG. 4 is a rear view of a motor vehicle showing the improved bumper of the present invention.

FIG. 5 is a side elevation view of the bumper of the present invention.

While the above-identified drawing figures set forth preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention. It should be specifically noted that the figures have not been drawn to scale, as it has been necessary to enlarge certain portions for clarity.

DETAILED DESCRIPTION

Figure 1:
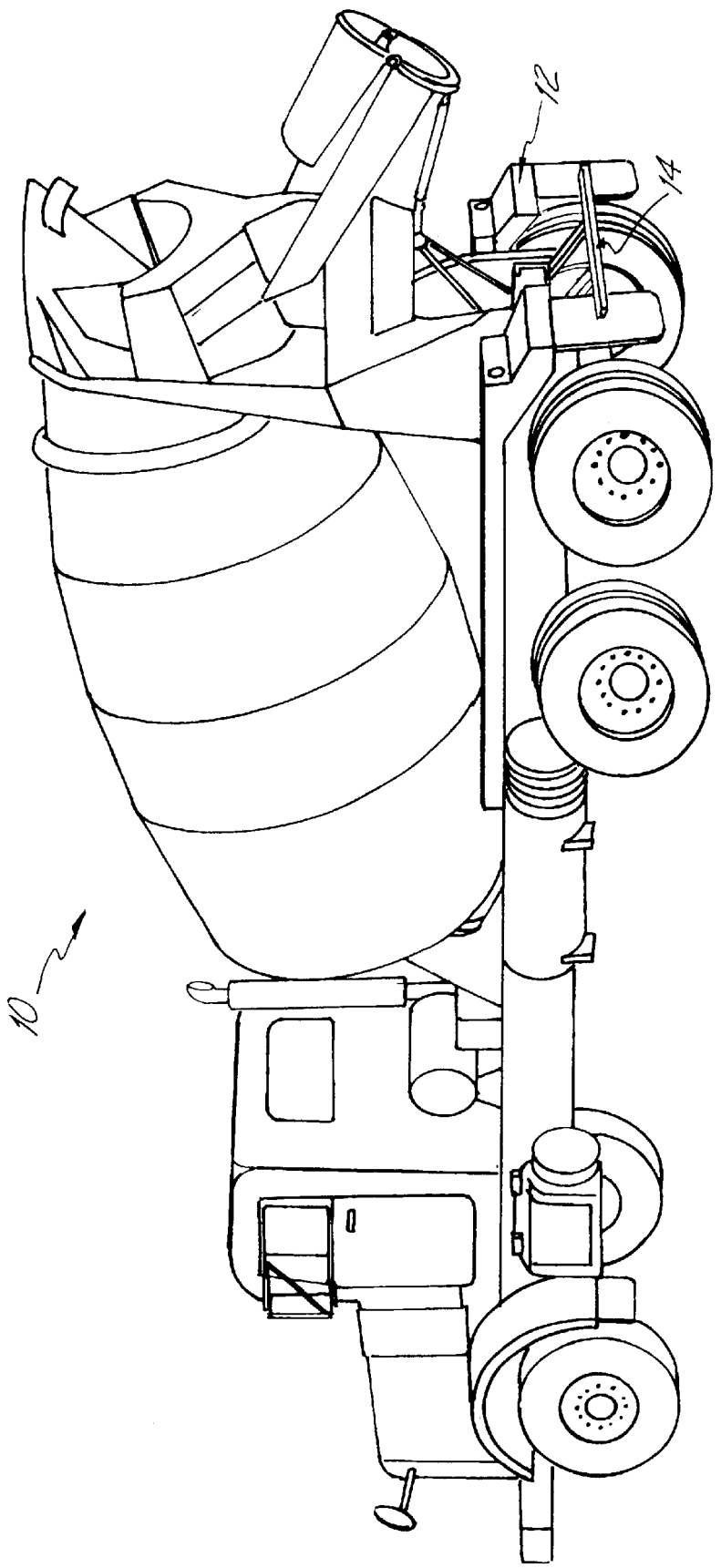
FIG. 1 is a perspective view of a concrete mixing truck with a bumper known in the art.

FIG. 1 shows an example of a utility vehicle 10 (e.g., a concrete mixing truck) which on occasion may be used off-road. Where the rear end 12 of vehicle 10 is greater than thirty inches above the ground, a bumper 14 must be incorporated into the vehicle to lower the effective height of the rear end of vehicle 10 to no more than thirty inches above the ground.

Figure 2:
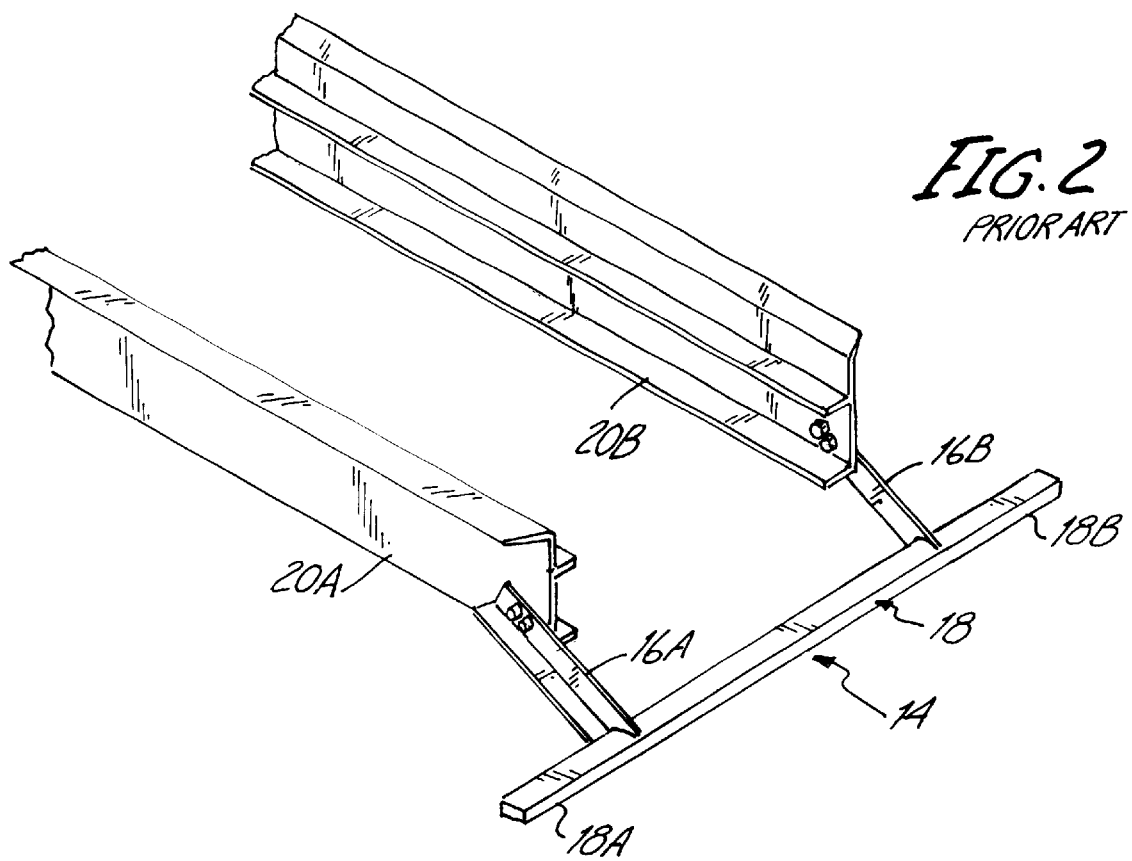
FIG. 2 is a perspective view of a motor vehicle frame with a prior art bumper.
Figure 3:
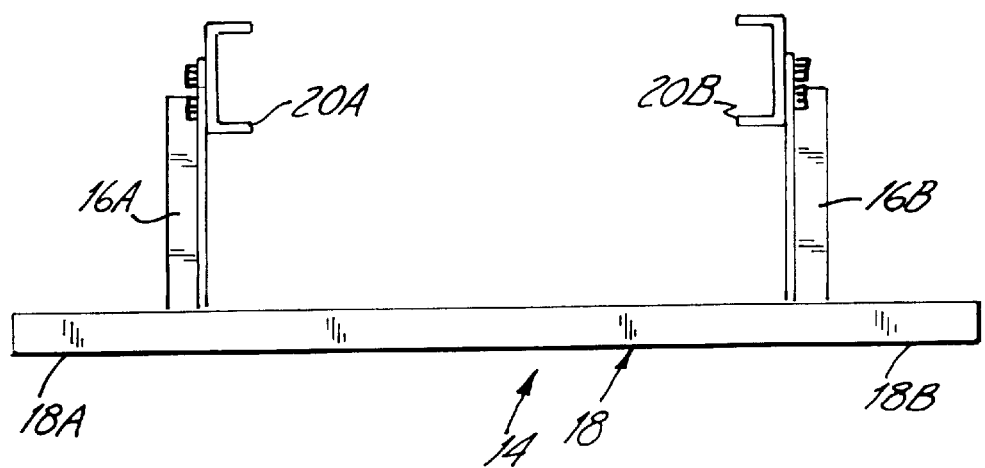
FIG. 3 is a rear elevation view of a motor vehicle with a prior art bumper.

As shown in FIGS. 2 and 3, bumper 14 of the prior art is comprised of spaced support members 16A, 16B and cross member 18. Support members 16A and 16B each are formed from angle iron and are bolted to vehicle frame members 20A, 20B, respectively. Cross member 18 consists of a metal beam that is welded to support members 16A and 16B. Cross member 18 has a length greater than the distance between supports 16A, 16B, resulting in end portions 18A and 18B, which extend to within 18 inches of the width of the motor vehicle. To the extent the bumper 14 contacts an object or the ground in the area of one or the other of end portions 18A or 18B, a particular end portion 18A or 18B may be bent out of alignment with cross member 18, or cross member 18 may be bent relative to support members 16A, 16B. Depending on the extent of damage to cross member 18 or end portions 18A or 18B, bumper 14 may be repaired by bending the end portion back into alignment, or alternatively the entire bumper 14 may be replaced. In either event, maintenance of prior art bumper 14 involves time, effort and expense, and may be required to comply with federal motor carrier safety regulations.

FIG. 4 is a rear view of a motor vehicle showing the improved bumper 30 of the present invention. As shown in FIG. 4, bumper 30 generally comprises a pair of mounting brackets 32A and 32B, which are mounted to vehicle frame members 34A and 34B, respectively by a plurality of bolts 36. Brackets 32A and 32B are mirror images of one another, with each bracket formed by bending plate metal to form a vertical portion 38 and a box 40 having walls 42, 44, 46 and 48. Brackets 32A and 32B are further reinforced by ribs 50, which are welded between vertical portion 38, wall 42 and a portion of wall 44 of box 40. Vertical portion 38 serves to connect brackets 32A and 32B to the respective vehicle frame member 34A, 34B.

Box 40 serves as a location for connecting and holding bumper mounting arms 52A and 52B. Each bumper mounting arm 52A, 52B is formed from a length of tubular metal that is dimensioned to fit between the inner surfaces of walls 44 and 48 of box 40. One end of mounting arms 52A, 52B is connected to box 40, between walls 44 and 48, by a bolt 54. The opposite end of mounting arms 52A, 52B is connected to bumper sections 56A, 56B, respectively, by welding. Bumper sections 56A and 56B are formed of tubular metal and are connected to arms 52A, 52B at approximately a mid-point of each section 56A, 56B. Bumper section 56A is laterally spaced from bumper section 56B by a small gap 58. Bumper 30 thereby is configured with a split bumper for reasons that will be apparent from the following further description of the invention.

Figure 4A:
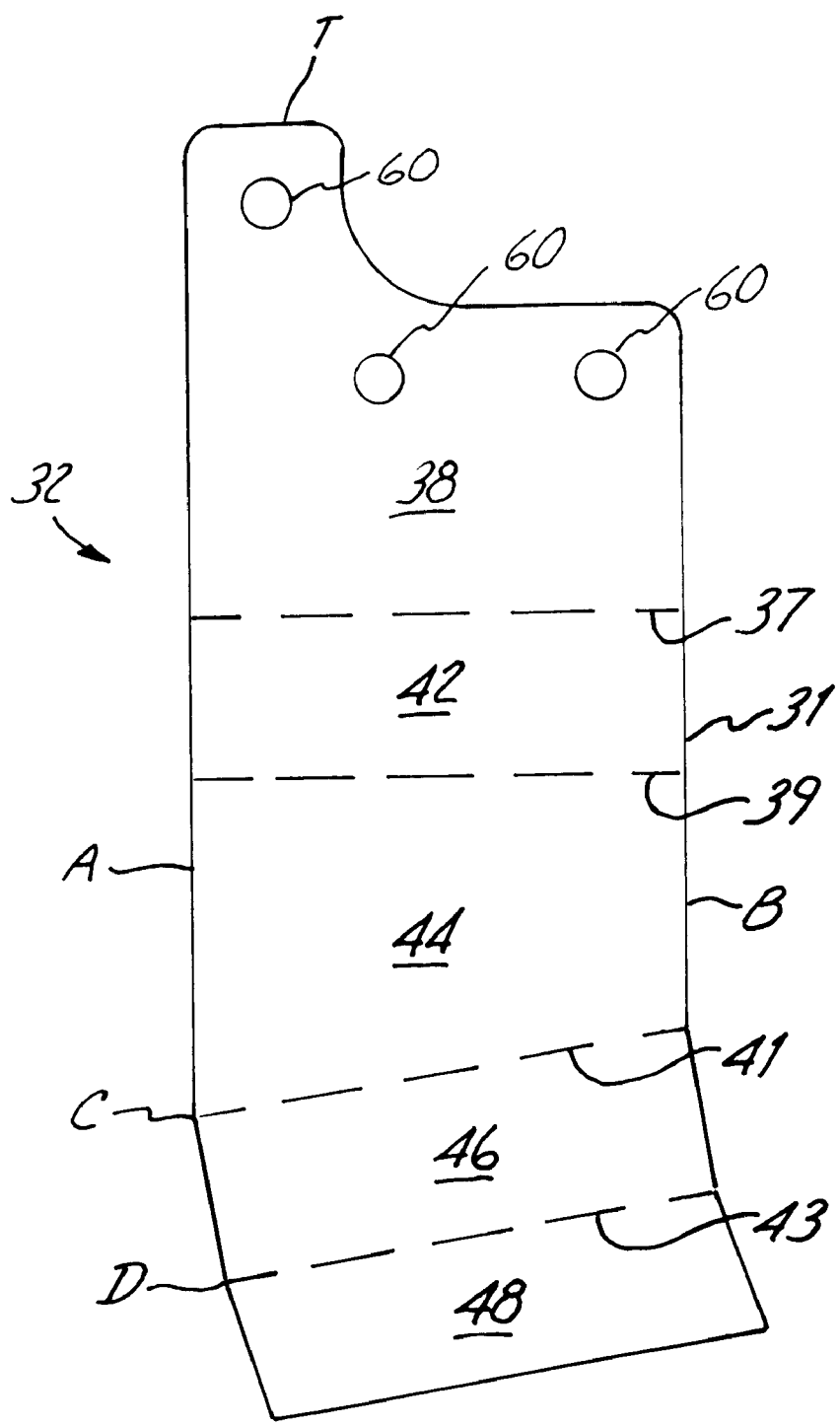
FIG. 4A is a flat layout of the bracket for the bumper of the present invention.

FIG. 4A is a flat layout of one of brackets 32A, 32B (i.e., bracket 32). Bracket 32 is formed from a sheet 31 of ASTM A36 grade steel having a thickness of about 0.25 inch. Bracket 32 is formed by bending sheet 31 along lines 37, 39, 41 and 43 to thereby define vertical section 38 and walls 42, 44, 46 and 48. As can be seen in FIG. 4, the difference between brackets 32A and 32B (i.e., being mirror images) is defined by the direction of the bends along lines 37, 39, 41, and 43. Each of walls 42, 44, 46 and 48 are formed by making 90° bends along lines 37, 39, 41 and 43. Referring again to FIG. 4A, the portion of sheet 31 corresponding to walls 42 and 44 is axially aligned with vertical section 38, with lines 37 and 39 being parallel to one another and perpendicular to the outer edges of sheet 31 at walls 42 and 44. The portion of sheet 31 corresponding to wall 46, however, is formed at an angle relative to wall 44, as defined by fold line 41. The outer edges of the portion of sheet 31 corresponding to wall 48 are formed at an angle relative to the outer edges of wall 46, with fold line 43 being parallel to line 41.

In one demonstrative embodiment, sheet 31 has a width, defined by the outer edges of vertical section 38 and walls 42 and 44, of about 7.75 inches. Walls 46 and 48 likewise have outer edges that define a width of about 7.75 inches, albeit initially offset before the bends are made to form brackets 32A, 32B. As measured from the top T of sheet 31, bend line 37 is located about 7.76 inches from top T, and line 39 is located about 10.34 inches from top T. Line 41 is located about 15.68 inches from top T along edge A and about 14.37 inches from top T along edge B. Line 43 is located about 18.24 inches from top T along edge A and about 16.93 inches from top T along edge B. The outer edges of sheet 31 corresponding to wall 46 are parallel to one another, as are the outer edges of sheet 31 corresponding to wall 48. Edge A of wall 46, however, is angularly offset from that of wall 44 such that the corner C formed by fold line 43 is laterally offset from edge A of wall 44 by a distance of about 0.43 inches. Correspondingly, corner D of wall 48 is laterally offset from edge A of wall 44 by a distance of about 1.21 inches. The aforementioned dimensions are but one example of how to form brackets 32A, 32B. The dimensions may be varied without departing from the intended scope of the invention, as will be evident to those skilled in the art.

FIG. 5 is a side elevation view of bumper 30 from the perspective of frame member 34B. As shown in FIG. 5, vertical section 38 of bracket 32B is provided with a plurality of holes 60, which match corresponding holes in frame member 34B, through which bolts 36 are inserted for connecting bracket 32B to frame member 34B. While section 38 is illustrated with a particular shape to accommodate three holes 60, it is contemplated that section 38 may be formed in any suitable configuration. In a preferred embodiment, vertical section 38 has a length sufficient to locate box 40 at or below the lowest extent of frame member 34B, although the function of bracket 32B is not dependent on the particular location of box 40 relative to frame member 34B (i.e., box 40 maybe located above the lowest extent of frame member 34B).

As further shown in FIG. 5, box 40 is configured to define a space for receiving arm 52B that in cross-section is trapezoidal, with wall 46 being formed at an angle relative to wall 42. Thus, in a preferred embodiment, wall 46 is sloped downward relative to the forward-most edge 62 of bracket 32B. This downward slope prevents arm 52B from pivoting upward in response to a horizontal force. Wall 46 thereby supports arm 52B to maintain bumper section 56B at the required height above the ground, and prevents arm 52B from pivoting downward in the event of a horizontal rear impact. A plate 63 dimensioned according to the size and shape of the forward-most edge 62 of walls 42, 44, 46 and 48 is welded to forward-most edge 62 for additional support of brackets 32A and 32B. A second rib 65 forms an upper part of plate 63, which ties plate 63 to wall 38 of brackets 32A and 32B for additional structural support. Rib 50 is secured to brackets 32A and 32B at the rearward-facing edge 68.

Figure 6:
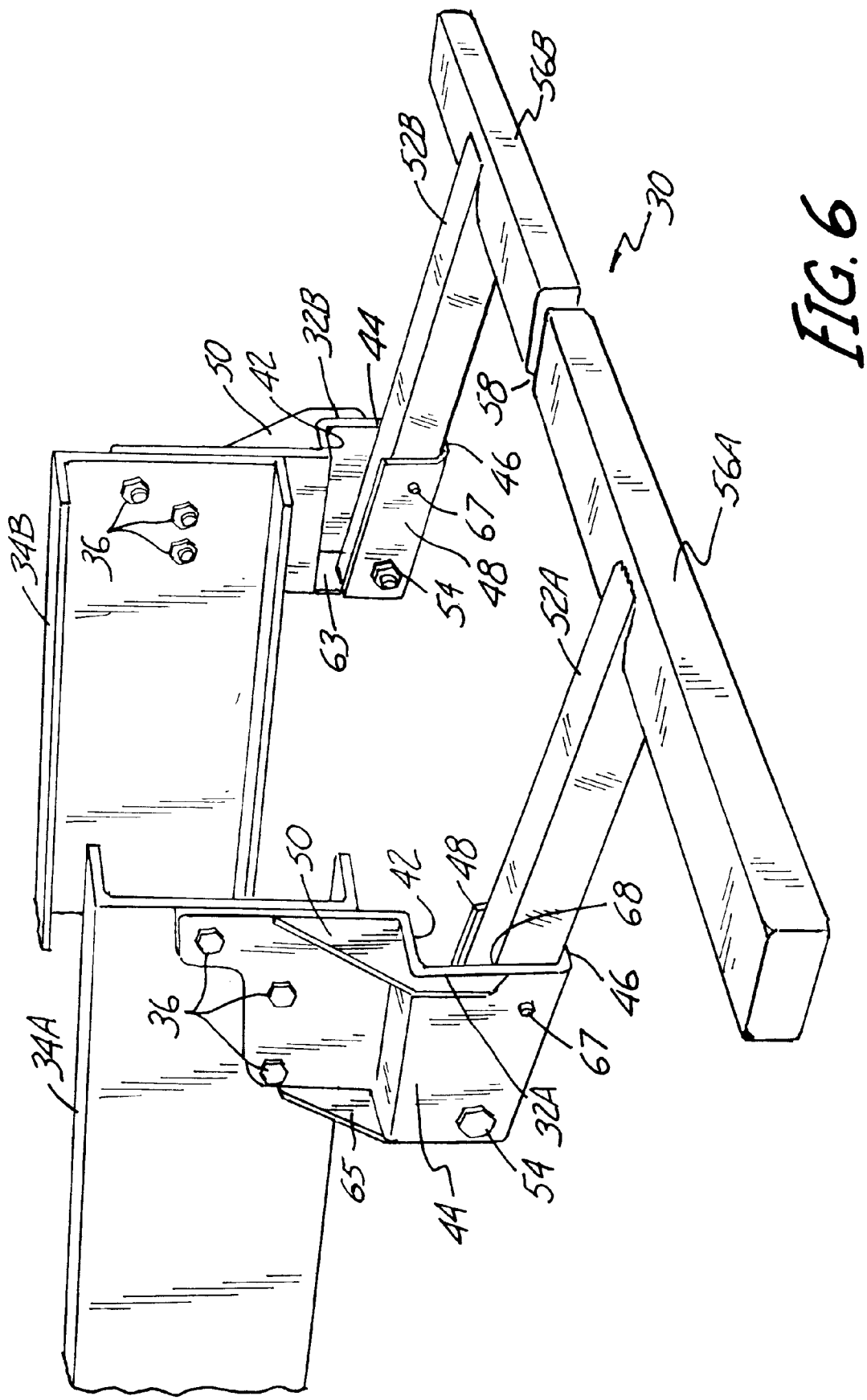
FIG. 6 is a rear perspective view of the motor vehicle frame with the bumper of the present invention.

As shown in FIGS. 5 and 6, arms 52A, 52B are provided with a hole 64, which is spaced relative to forward-facing edge 62 and corresponds with holes in walls 44 and 48, through which a bolt 54 is inserted to connect arm 52B to bracket 32B. A second hole 66 is formed in arms 52A, 52B rearward from hole 64, with walls 44 and 48 having corresponding holes that align with hole 66 when arms 52A, 52B are resting on wall 46. Hole 66 and the corresponding holes of walls 44 and 48 are provided for a shear pin 67, which is a redundancy for maintaining arms 52A, 52B relative to wall 46 (i.e., the home position).

In the event a sufficient vertical force F1 or F2 is applied to one of bumper sections 56A, 56B (i.e., when the vehicle is moving forward or backward over ground of changing elevation), the shear pin is severed, and arm 52B is capable of pivoting about bolt 54, with a range of motion defined at the lower extent by wall 46 and at the upper extent by wall 42 (at rearward-facing edge 68 of bracket 32B). The lower corner 70 of arms 52A, 52B adjacent to hole 64 (FIG. 5) are formed at an angle to prevent corner 70 from contacting wall 46 as arms 52A, 52B pivot.

Assuming for purposes of illustration that bumper section 56B is affected, when the vehicle pulls away from the object or ground contacted, gravity causes arm 52B and bumper section 56B return to the home position. The weight of arm 52B and bumper section 56B is sufficient to keep bumper 30 at the required height above the ground until the shear pin can be replaced. Thus, bumper 30 can remain in compliance with U.S. D.O.T. regulations even without the shear pin in place. Because bumper 30 is formed in two sections, only that section making contact is affected. Bumper 30 of the present invention is thus an effective bumper design for eliminating or substantially reducing the time and cost of maintaining a rear under-ride protection device of a motor vehicle.

What is claimed is:

1. A bumper system for connection to a motor vehicle frame having spaced frame members, the system comprising:
   a pair of brackets, each bracket comprising:
      a first portion which is connected to one of the frame members; and
      a second portion connected to the first portion, the second portion comprising a support surface;
   a pair of arms extending rearwardly from the motor vehicle frame, each arm having a first end and a second end, the first end of each arm pivotally connected to the second portion of each respective bracket, wherein each arm rests upon the support surface when the arm is in a first position, and wherein each arm is movable about the pivotal connection;
   a pair of spaced bumper sections, each bumper section connected to the second end of each respective arm.

2. The bumper system of claim 1 wherein the second portion comprises a U-shaped portion having spaced walls and a base wall connected to the spaced walls, the base wall defining the support surface.

3. The bumper system of claim 2 wherein the U-shaped portion comprises a forward-facing edge and a rearward-facing edge, and wherein the base wall slopes downward from the forward-facing edge to the rearward-facing edge.

4. The bumper system of claim 1 and further comprising:
   means for retaining each arm relative to the base wall.

5. The bumper system of claim 1 wherein each arm is configured to be capable of pivotal movement independent of the other arm.

* * * * *